Dec. 22, 1953  E. C. YATES  2,663,208
BAIL FOR FACILITATING THE APPLICATION OF TIRE CHAINS
Filed June 29, 1951
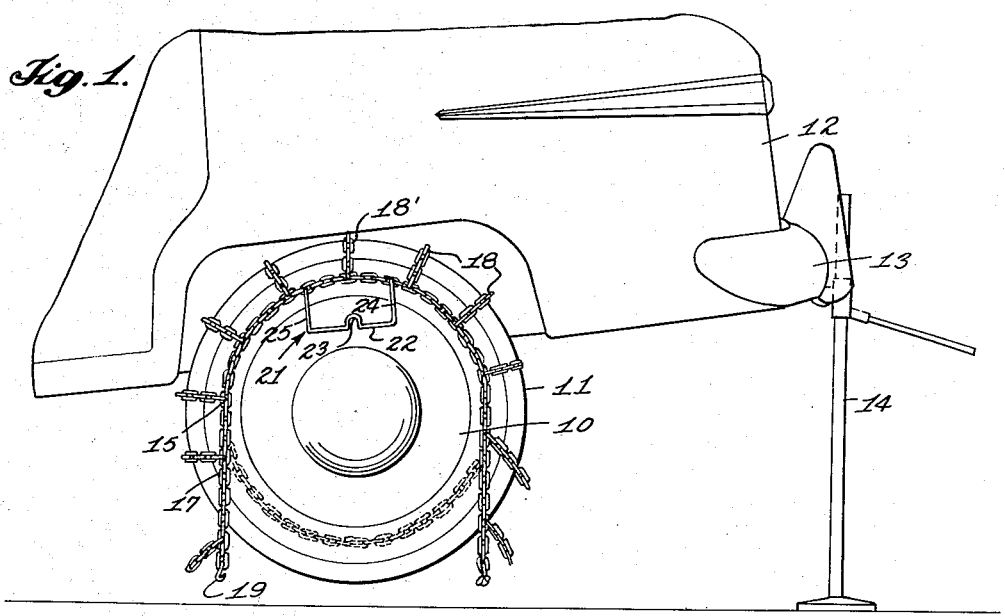
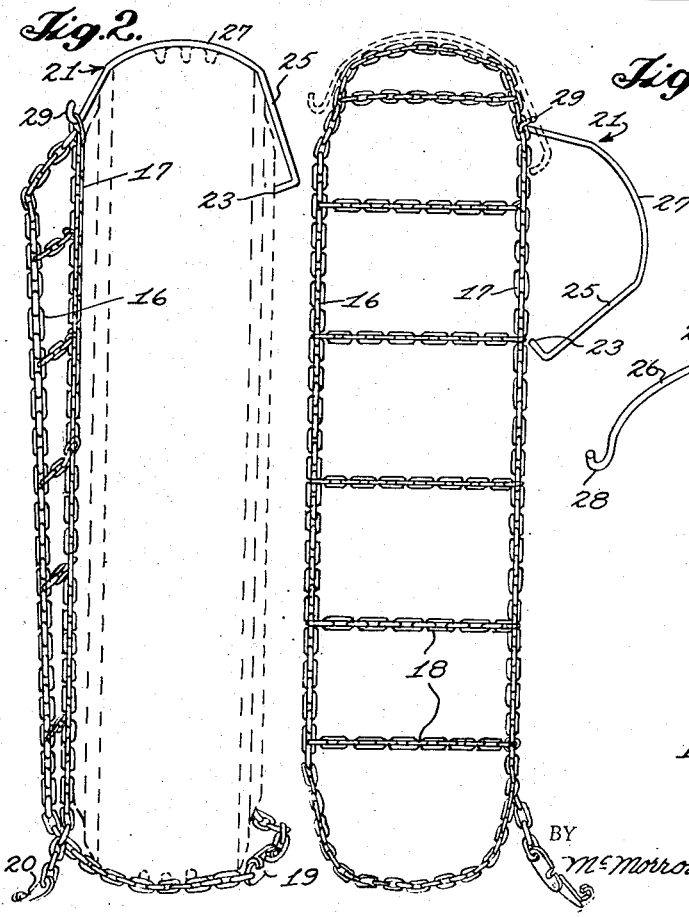
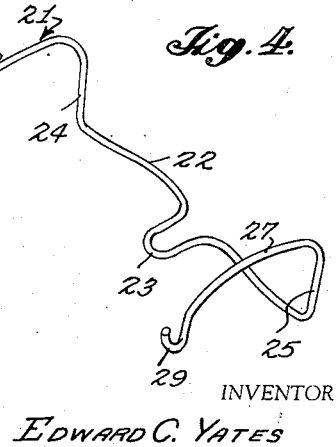
INVENTOR
EDWARD C. YATES
BY McMorrow, Berman & Davidson
ATTORNEYS Patented Dec. 22, 1953

2,663,208

UNITED STATES PATENT OFFICE 2,663,208

BAIL FOR FACILITATING THE APPLICATION OF TIRE CHAINS

Edward C. Yates, Beckley, W. Va.

Application June 29, 1951, Serial No. 234,183

1 Claim. (Cl. 81—15.8)

1

This invention relates to devices for applying antiskid chains to pneumatic tires and more particularly to a device for holding a chain on a tire while the ends of the chain are being connected.

It is among the objects of the invention to provide an improved device for supporting a tire chain on a vehicle tire so that the ends of the chain can be conveniently connected; which supports the chain in position on the associated tire, so that the ends of the chain at the inner side of the tire can first be connected at the outer side of the tire and then moved to the inner side of the tire after which the device may be moved to position the chain for connecting the ends of the chain at the outer side of the tire together; which fits upon a tire and the associated wheel rim in a manner to firmly support the chain on the tire; which obviates the necessity of a person lying on the ground or on a creeper under an automobile in order to apply the tire chains; and which is simple and durable in construction, economical to manufacture, convenient to carry in an automobile, and easy to use.

Other objects and advantages will become apparent from a consideration of the following description and the appended claim in conjunction with the accompanying drawing wherein:

Figure 1 is a side elevational view of a fragmentary rear portion of an automobile showing the device of the invention in use in applying an antiskid chain to a rear wheel tire of the vehicle;

Figure 2 is a diagrammatic tread elevational view of a vehicle tire showing an intermediate stage in the application of an antiskid chain to the tire by the chain applying device of the invention;

Figure 3 is a view similar to Figure 2, but showing a further stage in the application of the chain to the tire; and Figure 4 is a perspective view of the device.

With continued reference to the drawing, in Figure 1 the numeral 10 designates a vehicle rear wheel having a pneumatic tire 11 thereon. The numeral 12 designates a vehicle rear fender in which the upper portion of the tire is normally received, the numeral 13 designates the rear bumper of the vehicle, and the numeral 14 a bumper jack applied to the rear bumper 13 to raise the rear end of the vehicle and support the tire 11 slightly above the ground to facilitate the application of an antiskid chain to the tire. The numeral 15 designates an antiskid chain having side chains 16 and 17 and cross chains 18

2 extending between the side chains at spaced apart locations along the latter.

Each side chain is provided at one end with a hook, as designated at 19 and 20 in Figure 2, and at its other end with a blank link or ring in which the hook engages to connect the two ends of each side chain together about the tire 11.

As is clearly illustrated in Figure 1, when the chain is applied to the tire, one of the side chains, for example, the side chain 16, is disposed at the inner side of the tire, while the other side chain 17 is disposed at the outer side of the tire. Connecting the ends of the outer side chain by means of the corresponding hook and ring or blank link is comparatively easy, but connecting the ends of the side chain at the inner side of the tire ordinarily necessitates that a person crawl under the car or move under the car on a mechanic's creeper in order to reach the ends of the side chain at the inner side of the tire. When weather conditions are bad, as when there is snow or ice on the ground, this is a very unpleasant procedure and frequently results in a driver incurring unnecessary risks by delaying the application of antiskid chains to the tires of his vehicle.

The device of the present invention is designed to eliminate this necessity of having to move under the car in order to connect the ends of the side chain at the inner side of the tire.

The device, as generally indicated at 21, comprises a bail formed of a length of heavy wire or metal rod and including a center portion 22 having a U-shaped extension 23 projecting therefrom substantially at its mid-length location, the parts of the center portion at the opposite sides of the extension 23 being substantially in longitudinal alignment with each other. The bail further includes intermediate portions 24 and 25 extending one from each end of the center portion 22 and disposed substantially perpendicular to a plane including the longitudinal center line of the center portion inclusive of the U-shaped extension 23, and end portions 26 and 27 extending one from each intermediate portion 24 and 25 at the end of the corresponding intermediate portions remote from the center portion 22.

The end portions 26 and 27 are disposed generally perpendicular to the corresponding intermediate portions 24 and 25 and extend from these intermediate portions in the same direction that the U-shaped extension 23 projects from the center portion 22 of the bail. Each end portion is longitudinally curved with its concave side adjacent the center portion 22 and has a length and curvature to fit closely over the tread portion of a tire, as is particularly illustrated in Figures 2 and 3, with the extension 23 engaged against the outer side wall of the tire adjacent the tire carrying rim to secure the device in operative position on a tire and also space the end portions 26 and 27 from the adjacent side of the tire sufficiently to facilitate grasping these portions with the fingers when the bail is lifted over the tire.

The end portions 26 and 27 are provided at their ends remote from the corresponding intermediate portions with chain link engaging hooks 28 and 29 respectively, which hooks open toward the convex sides of the end portions and away from the center portion 22 of the bail. The length of the center portion 22 is somewhat less than twice the distance between adjacent cross chains 18, so that the hooks can be engaged with the chain at opposite sides of one of the cross chains and near the adjacent cross chain.

In using the device of the invention to apply a tire chain to a vehicle tire, after the vehicle has been jacked up to raise the corresponding wheel above the ground, the tire chain is laid over the tire with the cross chain, as designated at 18' in Figure 1, at the mid-length location of the tire chain disposed at the top of the tire. The hooks of the bail are then engaged in links of the outer side chain 17 at opposite sides of the middle cross chain 18' and the upper portion of the outer side chain is raised up over the top of the tire and allowed to fall down at the inner side of the tire. The bail then rests upon the upper surface of the tire with the extension 23 engaged against the tire sidewall adjacent the associated wheel rim and supports the outer side chain below the upper surface of the tire tread and at the inner side of the tire. The length of the cross chains will now permit the ends of the inner side chain 16 to be pulled outwardly around the bottom portion of the tire and connected together at the outer side of the tire, as illustrated in Figure 2. After the ends of the inner side chain have been connected together the bail is pulled outwardly over the top of the tire tread and the connected ends of the inner side chain are moved inwardly under the tire to the inner side thereof. The length of the center portion 22 of the device is such that the outer side chain will be brought over the top of the tire and will not bind against the inner edge of the tire tread. The necessary length of the center portion may be empirically determined for best results, but a length somewhat greater than one half the radius of the associated tire has been found to give satisfactory results in use. The outer side chain 17 is now moved to the outer side of the tire and the ends of this side chain are connected together at the outer side of the tire. After the ends of the outer side chain have been connected the bail is removed and a chain tightener may be applied to the outer side chain 17, if desired. The jack is then lowered to return the load of the vehicle to the wheel.

With the device of the present invention, a person can thus install an antiskid chain on a vehicle tire without reaching around the tire to connect the ends of the inner side chain and without having to lie under the vehicle for this purpose.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A device for applying antiskid chains to pneumatic tires comprising a rod-like bail having a center portion provided substantially at its mid-length location with a U-shaped projection, intermediate portions extending one from each end of said center portion substantially perpendicular to a plane including the center line of said center portion inclusive of said U-shaped projection, and end portions extending substantially perpendicularly one from each of said intermediate portions at the ends of the latter remote from said center portion and in the same direction from said center portion as said U-shaped projection, said end portions being longitudinally curved with their concave sides adjacent said center portion and each having a chain link engaging hook at the ends remote from the corresponding intermediate portion.

EDWARD C. YATES.

References Cited in the file of this patent

UNITED STATES PATENTS

| Number | Name | Date |
| --- | --- | --- |
| 710,477 | Littell | Oct. 7, 1902 |
| 1,222,453 | Otte | Apr. 10, 1917 |
| 1,621,720 | Harper | Mar. 22, 1927 |
| 2,497,975 | Bozzelli | Feb. 21, 1950 |